(No Model.)
D. EARL.
GARDEN IMPLEMENT.
No. 553,485. Patented Jan. 21, 1896.
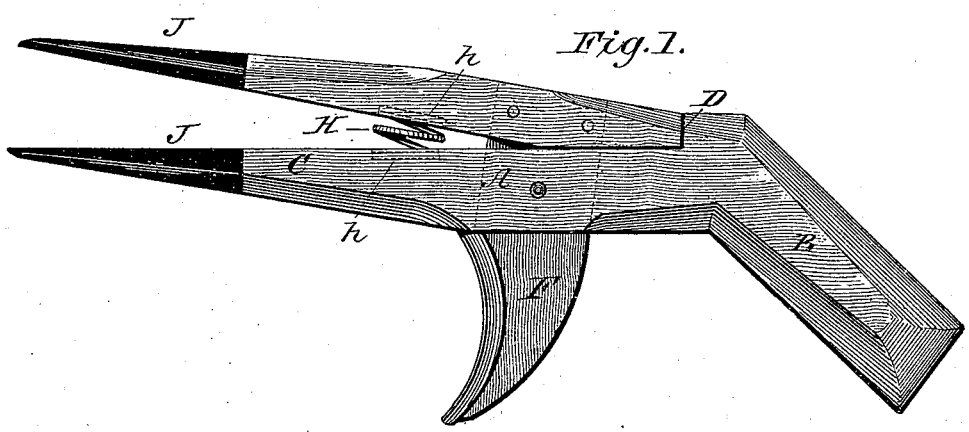
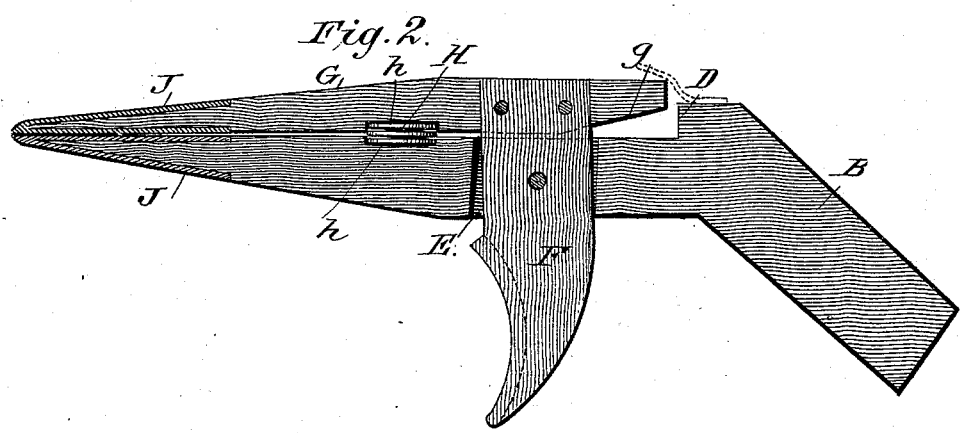
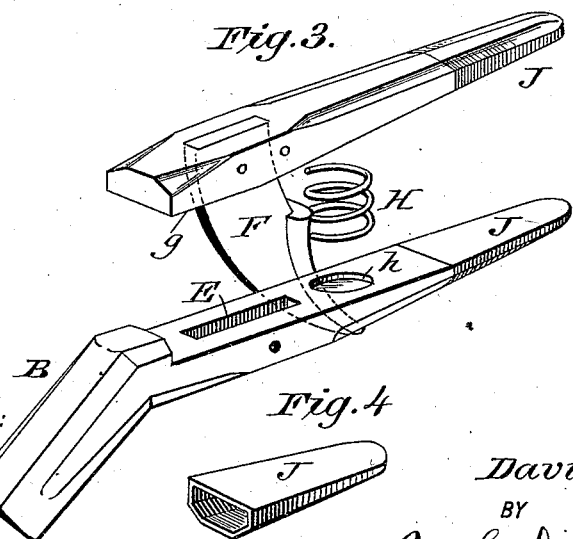
WITNESSES:
J. Edw. Luckett
M. E. DeMoll
INVENTOR
David Earl
BY
Fred G. Dieterich & Co.
ATTORNEYS

UNITED STATES PATENT OFFICE.

DAVID EARL, OF ASHLAND, KENTUCKY, ASSIGNOR OF ONE-HALF TO S. S. SAVAGE, OF SAME PLACE.

GARDEN IMPLEMENT.

SPECIFICATION forming part of Letters Patent No. 553,485, dated January 21, 1896.

Application filed June 22, 1895. Serial No. 553,633. (No model.)

*To all whom it may concern:*

Be it known that I, DAVID EARL, residing at Ashland, in the county of Boyd and State of Kentucky, have invented a new and useful Garden Implement, of which the following is a specification.

My invention is in the nature of a simple and inexpensive device for garden or truck farming uses, which is adapted to be worked by hand manipulation and which can be employed to worm and top tobacco, worm cabbage, for destroying potato bugs and other insects or plant pests.

My invention primarily has for its object to provide a device of this kind which can be easily manipulated, which will serve to destroy the insects or bugs and the eggs of such insects and bugs without requiring the removal of the leaf or plant and without injury to the leaves or plants.

Furthermore, it has for its object to provide a device of this character, which can be employed to thin out plants, pulling weeds and grass from between plants and flowers closely together, where it is difficult to reach them with the fingers, and also for thinning corn.

With other objects in view, which will hereinafter appear, my invention consists in the peculiar combination and novel arrangement of parts, such as will be first described in detail, and then be specifically pointed out in the appended claim, reference being had to the accompanying drawings, in which—

Figure 1 is a side view of my garden implement, the spring-jaw being shown to its open or normal position. Fig. 2 is a longitudinal section of the implement with the clamp-jaw to its closed position. Fig. 3 is a perspective view of the several parts detached; and Fig. 4 is a view of the clamp-shield, hereinafter referred to.

In the practical construction my invention embodies a body or hand-hold portion A, the rear end of which is formed into a handle B, adapted to fit the ball of the hand, while the front end terminates in a beak or clamp-jaw member C, the upper face of which extends rearward to a vertical shoulder D, the said part A, handle B, and beak being formed of a single rigid body, which in the simplest and cheapest construction of my invention is formed of wood, it being, however, manifest that if desired it may be made of metal.

The body portion A has a recess E, in which is pivoted a trigger member F, which extends upward and connects with the spring-jaw or clamping-beak G, which is also preferably formed of wood and has its rear end squared off to fit against the shoulder D, the lower face of the said rear end being made on an incline, as at $g$, so as to form a seat portion which bears on the upper face of the member A when the said beak G is at its upper or normal position, such seat portion forming a stop to limit the upward movement of the beak member G.

The member G is held spring-pressed to its normal position by means of a coil-spring H, the ends of which seat in sockets $h\ h$ in the upper and lower beak members disposed in advance of the trigger. While I prefer for simplicity of construction to arrange the spring in the manner shown, it is manifest such arrangement may be dispensed with and other equivalent devices may be employed for the same purpose, such as, for example, a flat spring held to press on the rear end of the upper beak, as indicated in dotted lines in Fig. 2.

When the device is made of wood, detachable shield or clamp members J are fitted on the ends of the beaks, as clearly shown in Fig. 2, which are secured thereto in any desired manner, which members may be made of hard rubber or metal and in some cases preferably have their biting faces slightly serrated or roughened.

From the foregoing description, taken in connection with the accompanying drawings, it is thought the advantages of my implement will be readily understood and appreciated. By its use obnoxious insects and weeds can be readily exterminated, it being especially useful in pulling weeds which cannot be pulled without the use of gloves, such as the Russian thistle. To thin corn the beaks or jaws are inserted in the hill of corn to grasp the stalk to be thinned out, which can then be quickly pulled up by the roots—an operation which is very difficult to do by hand. For the extermination of bugs or worms the long beaks are inserted over the leaf carrying the bug or eggs. By closing the jaws or beaks the bugs or eggs can be mashed on the leaf, leaving it in place on the plant to assume a normal growth, which ordinarily will take place after the bug or eggs are thus destroyed.

Having thus described my invention, what I claim, and desire to secure by Letters Patent, is—

The hereinbefore described improved implement, comprising a body portion A having an integral handle B and beak member C, a beak member G having a trigger portion pivoted to the member A, and having a diagonally cut seat portion $g$ said members C and G having sockets in advance of the pivot of the upper member, spring H held in such sockets, and metallic shield or clamp members J J fitted on the ends of the beak members all arranged substantially as shown and described.

DAVID EARL.

Witnesses:
E. T. COMERS,
W. C. STEELE.